(12) United States Patent
Kubicek et al.

(10) Patent No.: US 7,041,727 B2
(45) Date of Patent: May 9, 2006

(54) LATEX PAINT COMPOSITIONS AND COATINGS

(75) Inventors: Brian A. Kubicek, Woodbury, MN (US); Patricia M. Savu, Maplewood, MN (US); Edward R. Hauser, Hudson, WI (US); Jason T. Petrin, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 138 days.

(21) Appl. No.: 10/183,176

(22) Filed: Jun. 25, 2002

(65) Prior Publication Data

US 2003/0236340 A1 Dec. 25, 2003

(51) Int. Cl.
- C08L 27/12 (2006.01)
- C08L 33/08 (2006.01)
- C08L 33/10 (2006.01)
- C08L 25/14 (2006.01)
- C08L 25/12 (2006.01)

(52) U.S. Cl. ..................... 524/520; 524/523
(58) Field of Classification Search ........... 524/505, 524/520, 523, 544, 556
See application file for complete search history.

(56) References Cited

U.S. PATENT DOCUMENTS

| | | | |
|---|---|---|---|
| 2,803,615 A | | 8/1957 | Ahlbrecht et al. |
| 2,915,554 A | | 12/1959 | Ahlbrecht et al. |
| 3,574,791 A | * | 4/1971 | Sherman et al. ............ 525/276 |
| 3,787,351 A | | 1/1974 | Olson |
| 3,822,228 A | | 7/1974 | Petrella et al. |
| 3,891,591 A | | 6/1975 | Chang et al. |
| 4,208,496 A | | 6/1980 | Bergfeld et al. |
| 4,600,441 A | | 7/1986 | Goldberg et al. |
| 4,929,666 A | | 5/1990 | Schmidt et al. |
| 5,006,624 A | | 4/1991 | Schmidt et al. |
| 5,010,153 A | * | 4/1991 | Famili et al. ............... 526/243 |
| 5,037,920 A | | 8/1991 | Kriessmann et al. |
| 5,082,895 A | | 1/1992 | Wolff et al. |
| 5,468,812 A | * | 11/1995 | Muggli et al. .............. 525/293 |
| 5,672,673 A | | 9/1997 | Kirchmeyer et al. |
| 5,688,884 A | | 11/1997 | Baker et al. |
| 5,827,919 A | | 10/1998 | May |
| 6,235,813 B1 | * | 5/2001 | Brandt et al. ............... 523/436 |

FOREIGN PATENT DOCUMENTS

| | | |
|---|---|---|
| EP | 457610 A2 * | 11/1991 |
| EP | 0 614 955 B1 | 5/1998 |
| WO | WO 97/12923 | 4/1997 |
| WO | WO 01/30873 A1 | 5/2001 |
| WO | WO 02/20676 A1 | 3/2002 |

OTHER PUBLICATIONS

"Surfactant Science Series", Amphoteric Surfactants, edited by Eric G. Lomax, (1996), 2nd Edition, Marcel Dekker, Inc., New York.

"Organofluorine Chemicals and Their Industrial Applications", edited by R. E. Banks, (1979), pp. 56-57, Society of Chemical Industry, London/Ellis Horwood Ltd.

3M Fluorad™ Fluorosurfactant FC-4430 Product Information 98-0212-2584-6 (Mar. 2002).

3M Fluorad™ Fluorosurfactant FC-4432 Product Information 98-0212-2586-1 (Mar. 2002).

DuPont™ Zonyl® Fluoroadditives for Coatings Technical Information P-200125.8 (Feb. 2001).

J. O. Hendricks, "Industrial Fluorochemicals", Industrial and Engineering Chemistry, (1953), pp. 99-105, vol. 45, No. 1.

K. A. Haagenson, "The Effect of Extender Particle Size on the Hiding Properties of an Interior Latex Flat Paint", American Paint & Coatings Journal, (Apr. 4, 1988), pp. 89-94.

M. K. Bernett et al., "Wetting of Low-Energy Solids by Aqueous Solutions of Highly Fluorinated Acids and Salts", Journal of Physical Chemistry, (Nov. 1959), pp. 1911-1916, vol. 63.

N. O. Brace, "Long Chain Alkanoic And Alkenoic Acids with Perfluoroalkyl Terminal Segments", Alkanoic Acids with Perfluoroalkyl Terminal Segments, (Dec. 1962), pp. 4491-4498, vol. 27.

Preparation, Properties, and Industrial Applications of Organofluorine Compounds, edited by R. E. Banks, (1982), John Wiley & Sons, New York.

(Continued)

Primary Examiner—Callie Shosho
(74) Attorney, Agent, or Firm—Lisa P. Fulton

(57) ABSTRACT

A latex paint composition comprises (a) a polymer having interpolymerized units that comprise units derived from styrene, methyl styrene, vinyl, or combinations thereof and units derived from one or more acrylates, methacrylates, acrylonitrile, or combinations thereof, (b) hiding pigment, (c) non-cellulosic thickener, and (d) at least about 0.05 weight per volume percent fluorochemical acrylic polymer additive comprising (1) at least one perfluoroalkyl moiety selected from the group consisting of heptafluoropropanesulfonamido, nonafluorobutanesulfonamido, undecafluoropentanesulfonamido, and tridecafluorohexanesulfonamido moieties and (2) at least one polyoxyalkylene block comprising at least one alkyleneoxy moiety. Also, methods for providing paint coatings with such compositions.

34 Claims, No Drawings

OTHER PUBLICATIONS

R. S. Hunter, "Chapter 8 Uniform Color Scales", The Measurement of Appearance, (1975), pp. 102-132, John Wiley & Sons, New York.

U.S. Appl. No. 09/698,987, filed Oct. 27, 2000, Fluorochemical Sulfonamide Surfactants.
US 6,492,477, 12/2002, Savu et al. (withdrawn)

* cited by examiner

US 7,041,727 B2

LATEX PAINT COMPOSITIONS AND COATINGS

FIELD

The present invention relates to latex paint compositions and coatings comprising short chain fluorochemicals and to methods for imparting improved stain and soil resistance to latex paints.

BACKGROUND

Latex paints are often preferred over solvent-based paints because of their improved safety, lower toxicity, and lower volatile-organic contents. Generally, however, latex paints, particularly flat latex paints, have poor stain and soil resistance. Because of their highly porous nature and rough surface texture, flat latex paints tend to absorb stains. Penetrating type stains, such as ink, soft drinks, wine, and other colored liquids, have easy access to the interior of a flat paint film through numerous pores and microchannels, and surface dirt, such as handprints, smudges, dust, and other particulate matter, can become entrapped in the bumpy, rough texture of the paint surface.

In recent years, flat latex paints having improved stain and soil resistance with resulting improved cleanability have been formulated (see, for example, EP 0 614 955). In addition, various additives, including hydrocarbon acrylic polymers and fluorine-containing compounds, have been used to impart improved stain and soil resistance to latex paints. Consumers, however, desire flat latex paints that can provide still better stain and soil resistance with resulting improved cleanability.

SUMMARY

In view of the foregoing, we recognize that there is a need to improve the stain and soil resistance of latex paints, particularly flat latex paints, without detracting from the other desirable properties of the paint such as, for example, improved safety and minimized environmental impact.

Briefly, in one aspect, the present invention provides latex paint compositions and coatings (as used herein, the term "coating" refers to the latex paint composition after it has been applied to a substrate and has dried) that have improved stain and soil resistance with resulting improved cleanability. The compositions comprise a latex paint comprising (a) a polymer having interpolymerized units that comprise units derived from styrene, methyl styrene, vinyl, or combinations thereof and one or more units derived from acrylates, methacrylates, acrylonitrile, or combinations thereof, (b) hiding pigment, (c) non-cellulosic thickener, and (d) at least 0.05 weight per volume percent fluorochemical acrylic polymer additive comprising (1) at least one perfluoroalkyl moiety selected from the group consisting of heptafluoropropanesulfonamido, nonafluorobutanesulfonamido, undecafluoropentanesulfonamido, and tridecafluorohexanesulfonamido moieties and (2) at least one polyoxyalkylene block comprising at least one alkyleneoxy moiety; wherein said fluorochemical acrylic polymer comprises about 5 to about 30 weight percent carbon-bonded (that is, covalently bonded) fluorine based upon the total weight of said fluorochemical acrylic polymer, and said latex paint composition has a pigment volume concentration of at least 20% and less than its critical pigment volume concentration.

In other aspects, this invention also provides articles with at least one surface of the article coated with the paint compositions of the invention, and methods of imparting stain and soil resistance to a latex paint. The methods comprise (a) providing a latex paint composition comprising (1) a polymer having interpolymerized units that comprise units derived from styrene, methyl styrene, vinyl, or combinations thereof and units derived from one or more acrylates, methacrylates, acrylonitrile, or combinations thereof, (2) hiding pigment, and (3) non-cellulosic thickener; wherein said latex paint has a pigment volume concentration of at least 20% and less than its critical pigment volume concentration;(b) adding at least about 0.05 weight per volume percent of a fluorochemical acrylic polymer additive comprising (1) at least one perfluoroalkyl moiety selected from the group consisting of heptafluoropropanesulfonamido, nonafluorobutanesulfonamido, undecafluoropentanesulfonamido, and tridecafluorohexanesulfonamido moieties and (2) at least one polyoxyalkylene block comprising at least one alkyleneoxy moiety; wherein said fluorochemical acrylic polymer has about 5 to about 30 weight percent carbon-bonded fluorine based upon the total weight of said fluorochemical acrylic polymer to said latex paint composition; (c) applying the resulting composition of (b) to a substrate surface; and (d) allowing said resulting composition to dry such that a coating with a fluorine-enriched surface is formed on said substrate surface. As used herein, a "fluorine-enriched surface" refers to the surface of a coating that contains more fluorine at the surface than in the bulk.

DETAILED DESCRIPTION OF ILLUSTRATIVE EMBODIMENTS

It has been discovered that the fluorochemical acrylic polymer additives described herein, particularly those derived from perfluorobutanesulfonyl fluoride (PBSF), impart improved stain and soil resistance and repellency into the latex paint composition of the invention. Surprisingly, these fluorochemical acrylic polymers impart comparable, and in some instances better, stain and soil resistance and repellency than fluorochemical acrylic polymers with longer perfluoroalkyl segments such as perfluorooctanesulfonyl fluoride (POSF).

In light of the prior art, one would expect that coatings derived from shorter fluorochemical chains would not be as effective at imparting stain and soil resistance and repellency as those derived from longer fluorochemical chains. For instance, in the art of surfactants, particularly surfactants with fluorochemical chains, there is a preference for those with longer fluorochemical chains (for example, $C_6$–$C_{10}$ in U.S. Pat. No. 2,803,615 (Ahlbrecht et al.) and $C_6$–$C_{12}$ in U.S. Pat. No. 3,787,351 (Olson)). It has been observed in hydrocarbon surfactants and in surfactants derived from perfluorocarboxylic acids and sulfonic acids that increasing the chain length of the hydrocarbon chains decreases the critical micelle concentration (that is, less surfactant is needed in order to obtain the desired surface modification) (see, for example, AMPHOTERIC SURFACTANTS, edited by Eric G. Lomax, Marcel Dekker Inc. (1996); ORGANOFLUORINE CHEMICALS AND THEIR INDUSTRIAL APPLICATIONS, edited by R. E. Banks, Ellis Horwood Ltd., p. 56 (1979); J. O. Hendricks, Ind. Eng. Chem. 45, 103 (1953); M. K. Bernett and W. A. Zisman, J. Phys. Chem. 63, 1912 (1959))

Repellency results, in part, from low surface energies. The prior art suggests that only after the seven outermost carbon atoms of a perfluorinated carboxylic acid are fully fluorinated do the surface energies of various liquids on the surface approach those of a perfluoro fatty acid monolayer, which has a surface energy amongst the lowest ever recorded (see, for example, N. O. Brace, J. Org. Chem. 27, 4491 (1962), and W. A. Zisman, Advan. Chem., 22 (1964)). One would therefore expect the same to be true of fluorochemical acrylic polymers derived from PBSF. That is, one would expect that the surface energy of the polymer would be closely tied to the chain length of the fluorinated monomer. Yet, the fluorochemical acrylic polymers of the invention impart comparable, and in some instances better, stain and soil resistance and repellency than fluorochemical acrylic polymers with longer perfluoroalkyl segments.

It is particularly advantageous to use short chain perfluoroalkanesulfonyl fluorides, such as PBSF, to make the starting intermediates for the paint additives rather than using POSF because they can be produced at a lower cost per weight because of their higher yields (for example, by electrofluorination, the yield of PBSF is approximately 58% and the yield of POSF is approximately 31% (PREPARATION, PROPERTIES, AND INDUSTRIAL APPLICATIONS OF ORGANOFLUORINE COMPOUNDS, edited by R. E. Banks, Ellis Horwood Ltd., P. 37 (1982)) and still maintain their potency as repellents at the same weight percent.

Furthermore, it has been reported that certain pefluorooctyl-containing compounds may bioaccumulate in living organisms (see, for example, U.S. Pat. No. 5,688,884 (Baker et al.)). Short chain sulfonic acids, however, are less toxic and less bioaccumulative than the longer chain homologs. For example, PBSF, tested in the form of its potassium salt, eliminates from the body much more efficiently than POSF and perfluorohexanesulfonate (see, for example, WO 01/30873). Thus, the compositions of the invention meet the need in the art for latex paints having improved stain and soil resistance while maintaining the other desirable properties of the paint.

Paint Composition

Binding Polymer

Polymers useful as component (a), the "binding polymer", of the latex paints of the invention are copolymerization products of a mixture of co-monomers which comprise monomers selected from styrene, methyl styrene, vinyl, or combinations thereof. Preferably co-monomers comprise (more preferably consist essentially of) at least 40 mole percent of monomers selected from styrene, methyl styrene, or combinations thereof and at least 10 mole percent of one or more monomers selected from acrylates, methacrylates, and acrylonitrile. Preferably, the acrylates and methacrylates contain from 4 to 16 carbon atoms such as, for example, 2-ethylhexyl acrylate and methyl methacrylates. It is also preferable that the monomers be used in a proportion such that the final polymer has a glass-transition temperature (Tg) greater than 21° C. and less than 95° C. The polymers preferably have a weight-average molecular weight of at least 100,000.

Preferably, the binding polymer comprises interpolymerized units derived from 2-ethylhexyl acrylate. More preferably, the binding polymer comprises polymerized units comprising from 50 to 70 mole percent of units derived from styrene, methyl styrene, or combinations thereof; from 10 to 30 mole percent of units derived from 2-ethylhexyl acrylate; and from 10 to 30 mole percent of units derived from methyl acrylate, acrylonitrile, or combinations thereof.

Illustrative examples of suitable binding polymers include a copolymer whose interpolymerized units are derived from about 49 mole percent styrene, 11 mole percent α-methylstyrene, 22 mole percent 2-ethylhexyl acrylate, and 18 mole percent methyl methacrylates with a Tg of approximately 45° C. (available as Neocryl™ XA-6037 polymer emulsion from ICI Americas, Inc., Bridgewater, N.J.); a copolymer whose interpolymerized units are derived from about 51 mole percent styrene, 12 mole percent α-methylstyrene, 17 mole percent 2-ethylhexyl acrylate, and 19 mole percent methyl methacrylates with a Tg of approximately 44° C. (available as Joncryl™ 537 polymer emulsion from S. C. Johnson & Sons, Racine, Wis.); and a terpolymer whose interpolymerized units are derived from about 54 mole percent styrene, 23 mole percent 2-ethylhexyl acrylate, and 23 mole percent acrylonitrile with a Tg of approximately 44° C. (available from B. F. Goodrich Co. as Carboset™ XPD-1468 polymer emulsion). Preferably, the binding polymer is Joncryl™ 537.

Hiding Pigment

The latex paint of the invention comprises a hiding pigment to give the paints better "hiding power" or coverage. Preferably, the hiding pigment has a refractive index above about 1.8.

Suitable hiding pigments include white opacifying hiding pigments and colored organic and inorganic pigments. Representative examples of suitable white opacifying hiding pigments include rutile and anatase titanium dioxides, lithopone, zinc sulfide, lead titanate, antimony oxide, zirconium oxide, barium sulfide, white lead, zinc oxide, leaded zinc oxide, and the like, and mixtures thereof. A preferred white organic hiding pigment is rutile titanium dioxide. More preferred is rutile titanium dioxide having an average particle size between about 0.2 to 0.4 microns. Examples of colored organic pigments are phthalo blue and hansa yellow. Examples of colored inorganic pigments are red iron oxide, brown oxide, ochres, and umbers.

Thickener

Most known latex paints contain thickeners to modify the rheological properties of the paint to ensure good spreading, handling, and application characteristics. The latex paint of the invention comprises a non-cellulosic thickener (preferably, an associative thickener; more preferably, a urethane associative thickener).

Associative thickeners such as, for example, hydrophobically modified alkali swellable acrylic copolymers and hydrophobically modified urethane copolymers generally impart more Newtonian rheology to emulsion paints compared to conventional thickeners such as, for example, cellulosic thickeners. Representative examples of suitable associative thickeners include polyacrylic acids (available, for example, from Rohm & Haas Co., Philadelphia, Pa., as Acrysol™ RM-825 and QR-708 Rheology Modifier) and activated attapulgite (available from Engelhard, Iselin, N.J. as Attagel™ 40).

Fluorochemical Additive

The latex paint of the invention comprises at least about 0.05 weight per volume percent of a fluorochemical acrylic polymer additive ("fluorochemical additive"), which imparts improved stain and soil resistance to the latex paint composition of the invention. The fluorochemical additive comprises (1) at least one perfluoroalkyl moiety chosen from the group consisting of heptafluoropropanesulfonamido, nonafluorobutanesulfonamido, undecafluoropentanesulfonamido, and tridecafluorohexanesulfonamido moieties and (2) at least one polyoxyalkylene block comprising at least one alkyleneoxy moiety.

The perfluoroalkyl moieties useful in the invention are generally soluble over a wide range of polarity. Preferably, the perfluoroalkyl moiety is heptafluoropropanesulfonamido or nonafluorobutanesulfonamido. More preferably, the perfluoroalkyl moiety is nonafluorobutanesulfonamido.

Preferably, a plurality of perfluoroalkyl moieties is each linked to at least one polyoxyalkylene block by a polymer chain. The polyoxyalkylene blocks comprise at least one alkyleneoxy moiety. The alkyleneoxy moiety generally has 2 to 6 carbon atoms (preferably, 2 to 4 carbons atoms; more preferably, 2 or 3 carbon atoms). Preferred alkyleneoxy moieties include, for example, ethyleneoxy moieties and propyleneoxy moieties. Propyleneoxy moieties can be branched or linear.

When ethyleneoxy moieties and propyleneoxy moieties are linked together, they form polyoxyethylene and polyoxypropylene blocks respectively. Preferably, at least one polyoxypropylene block is attached to a polyoxyethylene block. Additional blocks of polyoxyethylene or polyoxypropylene can be present in random order as well. Such materials having an average molecular weight of about 500 to about 15,000 are commonly available under trade names such as, for example, Pluronic™ (or Pluronic™ R, a reverse Pluronic structure) from BASF Corporation.

More preferably, the polyoxypropylene block is also attached to a second polyoxyethylene block (or the polyoxyethylene block is attached to a second polyoxypropylene block). Particularly useful block polymers include those, for example, comprising a center block having from about 20 to about 55 propyleneoxy moieties and blocks to each side of the center block each having from about 5 to about 130 ethyleneoxy moieties. Other particularly useful block polymers include those comprising a center block having from about 15 to 165 ethyleneoxy moieties and blocks to each side of the center block each having from about 5 to about 25 propyleneoxy moieties.

Other preferred alkyleneoxy moieties are those derived from polyethylene glycols having a molecular weight of about 200 to about 10,000. Commercially available polyethylene glycols that are suitable for use in the invention include, for example, Carbowax™ (available from Union Carbide).

The acrylate portion of the fluorochemical additive comprises acrylate and/or methacrylate moieties. Acrylate and/or methacrylate moieties form part of the starting monomers as well as the final polyacrylate products. For example, nonafluorobutanesulfonamido acrylate can be copolymerized with a polyalkyleneoxy moiety to form surface-active agents. Thus, the fluorochemical acrylic polymer additives useful in the paint composition of the invention can be prepared, for example, by free radical initiated copolymerization of a nonafluorobutanesulfonamido radical-containing acrylate with a polyalkyleneoxy acrylate such as, for example, monoacrylate, diacrylate or mixtures thereof. The molecular weight of the polyacrylate copolymer can be controlled by adjusting the concentration and activity of initiator, concentration of monomers, and temperature, or by chain-transfer agents. The preparation of such polyacrylates and starting nonafluorobutanesulfonamido acrylates are known in the art (see, for example, U.S. Pat. No. 3,787,351 (Olson) and U.S. Pat. No. 2,803,615 (Ahlbrecht et al.) respectively, which are incorporated herein by reference in their entirety).

The polyalkyleneoxy acrylates can be prepared from commercially available hydroxypolyethers or polyoxyalkylene hydroxy compounds such as, for example, Pluronic™ or Carbowax™ polymers. Such hydroxy materials are reacted with acrylic acid, acrylyl chloride, or acrylic anhydride using methods known in the art. Alternatively, a polyalkyleneoxy diacrylate can be copolymerized with the nonafluorobutanesulfonamido acrylate to obtain a polyacrylate copolymer of the invention.

The above-described fluorochemical additives can optionally comprise a water-solubilizing polar group, which can be anionic, nonionic, cationic, or amphoteric. Preferably, the water-solubilizing polar group is anionic. More preferably, it is selected from the group consisting of sulfonates, sulfates, and carboxylates (for example, —$SO_3M$, —$OSO_3M$, and —C(=O)OM wherein M is hydrogen, a metal cation such as an alkali or alkaline earth metal cation (for example, sodium, potassium, calcium, or magnesium, and the like), or a nitrogen-based cation such as, for example, ammonium or a protonated tertiary amine (for example, ($HOCH_2CH_2$)$_2$ $N^{\oplus}$)$HCH_3$)).

The fluorochemical additives useful in the paint composition of the invention include those that can be represented by the following general formula:

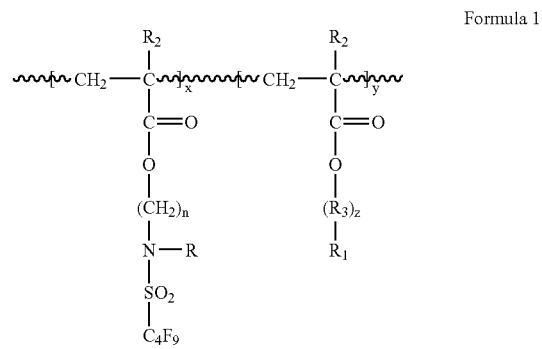

Formula 1 wherein ⁓⁓⁓ represents a bond in a polymerizable or polymer chain; R, $R_1$ and $R_2$ are each independently hydrogen or alkyl of 1 to 4 carbon atoms; $R_3$ is at least one or more straight or branched alkyleneoxy groups, linked together and having 2 to 6 carbon atoms, or a straight or branched alkylene group having 12 to 20 carbon atoms; n is an integer from 2 to 10; and x, y and z are integers of at least 1.

Preferred fluorochemical additives of Formula I include those in which R, $R_1$ and $R_2$ are each independently hydrogen or methyl and those in which n is 2.

Another preferred embodiment is that in which $R_3$ is a polyalkylene oxide group selected from those represented by formula A or formula B:

| Formula A | Formula B |
|---|---|
| $(EO)_p - (PO)_q - (EO)_p$ | $(PO)_q - (EO)_p - (PO)_q$ | wherein EO is an ethyleneoxy moiety, PO is a propyleneoxy moiety, p is an integer of 1 to about 165, and q is an integer of 0 to about 55.

Preferably, when $R_3$ is a polyalkylene oxide group of Formula A, p is an integer of about 5 to about 130 and q is an integer of about 20 to about 55. More preferably, p is about 11 and q is about 21. Even more preferably, p is about 11, q is about 21, and R is methyl.

Preferably, when $R_3$ is a polyalkylene oxide group of Formula B, q is an integer of about 5 to about 25 and p is an integer of about 10 to about 165.

The fluorochemical additives useful in the paint composition of the invention also include the reaction products of the following monomers or oligomers:

(i) a compound represented by the following general formula:

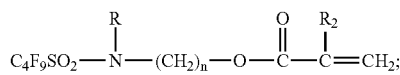

(ii) a compound selected from the group consisting of

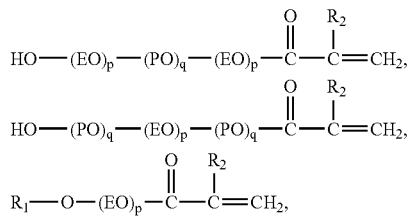

and mixtures thereof; and (iii) a compound represented by the following general formula:

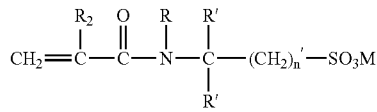

wherein R, $R_1$, $R_2$, R' are hydrogen or alkyl of 1 to 4 carbon atoms, EO is an ethyleneoxy moiety, PO is a propyleneoxy moiety, p is an integer of 1 to about 130, q is an integer of 0 to about 55, n is an integer of 2 to about 10, n' is an integer of 1 to about 10, and M is hydrogen, a cation, or a protonated tertiary amine.

Preferably, (iii) is a compound represented by the following general formula:

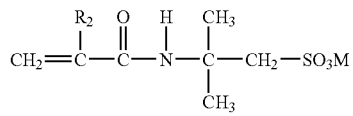

wherein $R_2$ is hydrogen or methyl and M is hydrogen, potassium, ammonium, lithium, or a protonated tertiary amine.

In a particularly useful embodiment, the fluorochemical additive comprises the reaction product of (i), (ii), (iii), and (iv) wherein (iv) is a compound represented by the general formula A-O—C(=O)C($R_2$)=$CH_2$; where A is an amine-containing group or an alkyl of 12 to 20 carbon atoms.

The fluorochemical additives useful in the paint composition of the invention also include the reaction products of the following:

(i) a compound represented by the following general formula:

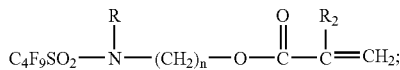

(ii) a compound selected from the group consisting of

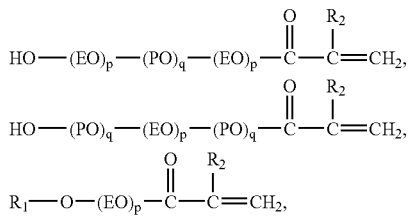

and mixtures thereof; and (iii) a compound represented by the following general formula:

$$M\text{-}O\text{—}C(=O)\text{—}C(R_2)=CH_2$$

Wherein R, $R_1$, $R_2$, and R' are independently hydrogen or alkyl of 1 to 4 carbons atoms, n is an integer of 2 to about 10, EO is an ethyleneoxy moiety, PO is a propyleneoxy moiety, p is an integer of 1 to about 130, q is an integer of 0 to about 55, and M is H, potassium, sodium, ammonium, or protonated tertiary amine. Preferably, M is H or ammonium.

In a particularly useful embodiment, the fluorochemical additive comprises the reaction product of (i), (ii), (iii), and (iv) wherein (iv) is a compound represented by the general formula A-O—C(=O)C($R_2$)=$CH_2$; where A is an amine-containing group or an alkyl of 12 to 20 carbon atoms.

In pure form, the fluorochemical additives useful in the paint compositions of the invention are typically viscous liquids or glassy solids. They are soluble in polar synthetic resinous compositions and have about 5 to about 30 weight percent carbon-bonded fluorine based upon the total weight of the fluorochemical additive (preferably, about 10 to about 25 weight percent).

The latex paint composition of the invention comprises at least about 0.05 weight per volume percent fluorochemical additive (preferably at least about 0.1 weight per volume percent). The amount of fluorochemical additive generally ranges up to about 3 weight per volume percent (preferably up to about 0.3 weight per volume percent). More fluorochemical additive can be used (up to about 10 weight per volume percent), but the use of high concentrations will typically, at some point, become cost prohibitive.

Other Ingredients

Latex-paint films are formed by coalescence of the binding polymer to form a binding matrix at the ambient paint application temperature to form a hard, tack-free film. Coalescing solvents aid the coalescence of the film-forming binder by lowering the film-forming temperature. The latex paints of the invention preferably contain a coalescing solvent. Representative examples of suitable coalescing solvents include 2-phenoxyethanol, diethylene glycol butyl ether, dibutyl phthalate, diethylene glycol, 2,2,4-trimethyl-1,1,3-pentanediol monoisobutyrate, and combinations thereof. Preferably, the coalescing solvent is diethylene glycol butyl ether (butyl carbitol) (available from Sigma-Aldrich, Milwaukee, Wis.) or 2,2,4-trimethyl-1,1,3-pentanediol monoisobutyrate (available from Eastman Chemical Co., Kingsport, Tenn., as Texanol™), or combinations thereof.

Coalescing solvent is preferably utilized at a level between about 12 to 60 grams (preferably about 40 grams) of coalescing solvent per liter of latex paint or at about 20 to 30 weight percent based on the weight of the polymer solids in the paint.

Paints can be manufactured to have a desired degree of gloss or shininess. Paint gloss is defined using ASTM Test Method D523 "Standard Test Method for Specular Gloss." Gloss ratings by this test method are obtained by comparing the reflectance from the specimen (at an angle of 20°, 60°, or 85° measured from the vertical) to that from a polished glass standard. Gloss readings at 20 describe the "depth" of gloss and are typically only used to describe gloss or semi-gloss paints. Gloss readings at 60° are used to describe most paints, except for completely flat paints. Gloss readings at 85° describe the "sheen" of flat, eggshell, and satin paints.

Typically, paints are categorized by their gloss values. For example, the Master Paint Institute (MPI) categorizes paints as follows:

| Type of Paint | 20° Gloss | 60° Gloss | 85° Gloss |
| --- | --- | --- | --- |
| Gloss | 20–90 | 70–85+ | — |
| Semi-gloss | 5–45 | 35–75 | — |
| Satin | — | 20–35 | min. 35 |
| Eggshell | — | 10–25 | 10–35 |
| Flat/matte | — | 0–10 | max. 35 |

The latex paints of the invention preferably have an 85° gloss less than or equal to about 20 and would therefore typically be considered eggshell or flat paints.

Flatter paints can be produced using various approaches. One approach is to increase the pigment volume concentration (that is, the ratio by volume of all pigments in the paint to total nonvolatiles) (PVC) of the paint above its critical pigment volume concentration (CPVC). At the CPVC, many physical and optical properties of paint change abruptly and the paint changes from a semi-gloss paint to a flat paint. Typically, though, high PVC flat paints exhibit less durability than lower PVC flat paints, all else being equal, because these flat paints have less binder available per unit of pigment.

Alternatively, a flat paint can be produced by adding a flatting agent (that is, a material which reduces the gloss of a paint film). Flatting agents introduce micro-roughness to the surface causing the light to be reflected in a diffuse manner, which reduces the apparent gloss. This latter approach generally produces a better paint film.

Therefore, the flat paints of the present invention have a PVC of at least 20% and less than their CPVC, but preferably contain a flatting agent. Preferably, the PVC is below about 54%; more preferably, below about 52%. Suitable flatting agents include silicas of various types such as, for example, Novacite™ Silica (available from Malvern Minerals, Hot Springs National Park, Ark.).

The paints of this invention may further comprise conventional materials used in paints such as, for example, plasticizer, anti-foam agent, pigment extender, pH adjuster, tinting color, and biocide. Such typical ingredients are listed, for example, in TECHNOLOGY OF PAINTS, VARNISHES AND LACQUERS, edited by C. R. Martens, R. E. Kreiger Publishing Co., p. 515 (1974).

Paints are commonly formulated with "functional extenders" to increase coverage, reduce cost, achieve durability, alter appearance, control rheology, and influence other desirable properties. Examples of functional extenders include, for example, barium sulphate, calcium carbonate, clay, gypsum, silica, and talc.

The most common functional extenders for interior flat paints are clays. Clays have a number of properties that make them desirable. Inexpensive calcined clays, for example, are useful in controlling low-shear viscosity and have a large internal surface area, which contributes to "dry hide". But, this surface area is also available to trap stains.

Because of their tendency to absorb stains, it is preferable that calcined clays are used in the paints of the invention only in the small amounts required for rheology control, for example, typically as less than about half of the total extender pigment, or are not used at all. The preferred extenders for use in the paints of the invention are calcium carbonates; most preferred are ultra-fine ground calcium carbonates such as, for example, Opacimite™ (available from ECC International, Sylacauga, Ala.), Supermite™ (available from Imerys, Roswell, Ga.), or others having particle size of approximately 1.0 to 1.2 microns. Ultra-fine calcium carbonate help to space titanium dioxide optimally for hide (see, for example, K. A. Haagenson, "The effect of extender particle size on the hiding properties of an interior latex flat paint," American Paint & Coatings Journal, Apr. 4, 1988, pp. 89–94).

Preparation of the Paint Composition

The latex paints of the invention can be prepared utilizing conventional techniques. For example, some of the paint ingredients are generally blended together under high shear to form a mixture commonly referred to as "the grind" by paint formulators. The consistency of this mixture is comparable to that of mud, which is desirable in order to efficiently disperse the ingredients with a high shear stirrer. During the preparation of the grind, high shear energy is used to break apart agglomerated pigment particles.

The ingredients not included in the grind are commonly referred to as "the letdown". The letdown is usually much less viscous than the grind, and is usually used to dilute the grind to obtain a final paint with the proper consistency. The final mixing of the grind with the letdown is typically carried out with low shear mixing.

Most polymer latexes are not shear stable, and therefore are not used as a component of the grind. Incorporation of shear unstable latexes in the grind can result in coagulation of the latex, yielding a lumpy paint with no, or little, film-forming capability. Consequently, paints are generally prepared by adding the latex polymer in the letdown.

However, the preferred paints of this invention contain latex polymers that are generally shear stable. Therefore, the latex paints of the invention can be prepared by incorporating some or all of the latex polymer into the grind. Preferably, at least some of the latex polymer is put in the grind.

Method of Imparting Stain and Soil Resistance

The fluorochemical acrylic polymer additives described above can be used to impart improved stain and soil resistance to latex paint compositions that have a pigment volume concentration of at least 20% and less than its critical pigment volume concentration and that comprise (a) a polymer having interpolymerized units that comprise units derived from styrene, methyl styrene, vinyl, or combinations thereof and units derived from one or more acrylates, methacrylates, acrylonitrile, or combinations thereof, (b) hiding pigment, and (c) noncellulosic thickener. Preferably, the polymer's interpolymerized units comprise at least 10 mole percent of units derived from styrene, methyl styrene, or combinations thereof and at least 10 mole percent of units derived from one or more acrylates, methacrylates, acrylonitrile, or combinations thereof. A latex paint coating with improved stain and soil resistance can be obtained by providing such a latex paint composition, adding at least 0.05 weight per volume percent fluorochemical acrylic polymer additive, applying the resulting composition to a substrate surface, and allowing the resulting composition to dry such that a coating with a fluorine-enriched surface is formed on the substrate surface.

The resulting composition should be allowed to dry in a manner that allows the fluorochemical additive to migrate to the surface of the coating as it dries so that the resulting dried coating has a fluorine-enriched surface. Preferably, the composition is allowed to dry on the substrate surface under typical indoor temperature (about 10° C. (50° F.) to about 40° C. (100° F.)) and humidity (about 20% to about 90% relative humidity) conditions.

EXAMPLES

The invention will be further explained by the following illustrative examples which are intended to be non-limiting.

Glossary Table

| Descriptor | Description, Structure and/or Formula | Availability/ Preparation |
|---|---|---|
| AA | Acrylic acid | Sigma-Aldrich, Milwaukee, WI |
| Acrysol | ACRYSOL ™ RM-825; Thickener | Rohm and Haas Co., Philadelphia, PA |
| AMPS | 2-Acrylamido-2-methyl-1-propanesulfonic acid; $H_2C=CHC(O)NHC(CH_3)_2CH_2SO_3H$ | Sigma-Aldrich, Milwaukee, WI |
| Attagel | ATTAGEL ™ 40; activated attapulgite | Engelhard, Iselin, NJ |
| Butyl Carbitol | diethylene glycol butyl ether | Sigma-Aldrich, Milwaukee, WI |
| Colortrend | Raw Umber 888–2009; Premixed with water (1:10) | Degussa, Philadelphia, PA |
| CW750A | $CH_3O(CH_2CH_2O)_{17}C(O)CH=CH_2$ | U.S. Pat. No. 3,728,151 (Sherman, et al., Example 17) |
| DMAEMA | Dimethylaminoethyl methacrylate | Sigma-Aldrich, Milwaukee, WI |
| Drew | DREWPLUS ™ L- 475 | Ashland Specialty Chemical Co, Dublin, OH |
| Joncryl | JONCRYL ™ 537 | Johnson Polymer, Inc, Sturtevant, WI |
| Kaolin | KAOPLATE ™ Clay | Thiele Kaolin Co., Sandersville, GA |
| MeFBSEA | $C_4F_9SO_2N(CH_3)CH_2CH_2OC(O)CH=CH_2$ | See Preparation 1 below |
| MeFBSEMA | $C_4F_9SO_2N(CH_3)CH_2CH_2OC(O)C(CH_3)=CH_2$ | See Preparation 2 below |
| Novacite | NOVACITE ™ 1250; Silica | Malvern Minerals, Hot Springs National Park, AR |
| Nuosept | NUOSEPT ™ 95; Biocide | Degussa, Philadelphia, PA |
| Pluronic | PLURONIC ™ Acrylate $HO(CH_2CH_2O)_{11}[CH(CH_3)CH_2O]_{21}(CH_2CH_2O)_{11}C(O)CH=CH_2$ | U.S. Pat. No. 3,787,351 (Olson, Example 1) |
| Propylene Glycol | $CH_3CHOHCH_2OH$ | Sigma-Aldrich, Milwaukee, WI |
| Stearyl methacrylate | $C_{18}H_{37}OC(O)C(CH_3)=CH_2$ | Sigma-Aldrich, Milwaukee, WI |
| Supermite | SUPERMITE ™; $CaCO_3$ | Imerys, Roswell, GA |
| Texanol | TEXANOL ™ ester alcohol | Eastman Chemical Company, Kingsport, TN |
| Ti-Pure | TI-PURE ™ titanium dioxide; R900 | DuPont, Wilmington, DE |
| Zonyl | ZONYL ™ 8867-L; Fluorochemical Urethane | DuPont, Wilmington, DE |

The fluorochemical additive can be added to the latex paint composition at any point during or after its formulation (for example, during the grind or the letdown or after all other ingredients have been blended). Preferably, the fluorochemical additive is added during the letdown.

The resulting latex paint composition can be applied to various substrate surfaces, such as, for example architectural surfaces such as walls and ceilings, articles such as furniture and boxes, or any other surface that is normally painted.

Preparation 1: Synthesis of MeFBSEA

Ethoxylation of MeFBSA with Ethylene Carbonate

Reaction:

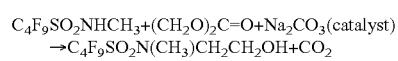

$C_4F_9SO_2NHCH_3+(CH_2O)_2C=O+Na_2CO_3(\text{catalyst})$
$\rightarrow C_4F_9SO_2N(CH_3)CH_2CH_2OH+CO_2$ Charges:
  A. 100 g MeFBSA ($C_4F_9SO_2NHCH_3$, MW=313, 0.32 moles)

B. 2.8 g Na$_2$CO$_3$ (0.026 moles)

D1. 8 g ethylene carbonate (MW=88) (available from Sigma-Aldrich, Milwaukee, Wis.) melted in oven at 50° C.

D2. 8 g ethylene carbonate

D3. 8 g ethylene carbonate

D4. 10 g ethylene carbonate (total weight=34 g, 0.38 moles)

E. 300 ml water

F. 300 ml water

G. 300 ml 3 wt % sulfuric acid

H. 300 ml water

I. 300 ml water

J. 300 ml water

Procedure:

1. Charges A, B, and C were placed in a one liter 3-necked flask with an overhead stirrer, thermocouple, addition funnel, and reflux condenser.
2. The batch was heated to 60° C. (140° F.) at which point the batch was molten and the stirring was begun. The set point was increased to 120° C. (248° F.).
3. When the batch reached 120° C., Charge D1 was removed from the oven and transferred to the addition funnel. Charge D1 was then added slowly over a period of 10 minutes. Outgasing (carbon dioxide) was observed. Thirty minutes elapsed until the rate of outgasing was noticed to have diminished.
4. Charge D2 was then transferred to the addition funnel and added over a period of 5 minutes. After 25 minutes, the rate of outgasing had slowed and Charge D3 was added over a 5 minute period. After 30 minutes, Charge D4 was removed from the oven, added to the addition funnel and added to the batch over a 5 minute period.
5. The set point was reduced to 110° C. (230° F.) and allowed to stir overnight.
6. In the morning, the batch was cooled to 90° C. (194° F.) and the batch was sampled. Gas chromatographic (GC) analysis showed the material to be 96.1% desired product and to contain no amide. Charge E was added. The batch was stirred for 30 minutes, allowed to phase split and the upper water phase was vacuum decanted off. The operation was repeated for Charge F at 63° C. (145° F.).
7. After the water washes, the batch was agitated with Charge G for 30 minutes at 63° C. (145° F.), then was phase split, and vacuum decanted. The pH of the water layer was tested and found to be less than 2.
8. After the acid wash, the batch was washed with water charges H, I, and J successively at 63° C. (145° F.).
9. The batch was melted and poured out of the flask into a bottle and allowed to solidify. A small amount of water on top of the resulting solid was poured off, and the remaining solid material in the jar was found to weigh 124 g.
10. The solid material was melted into a two-necked 500 ml flask. The melting point was found to be 57° C. (135° F.).
11. The resulting liquid material (113 g) was distilled at 667–933 Pa (5–7 torr Hg). 104 g (92% of undistilled material) distilled at a head temperature of 130–137° C. (266–279° F.) and a pot temperature of 136–152° C. (277–306° F.). Further increase of the pot temperature to 170° (338° F.) resulted in no further material distilling over.

Preparation of MeFBSEA (N-methyl-perfluorobutane sulfonylethyl acrylate)

Reaction:

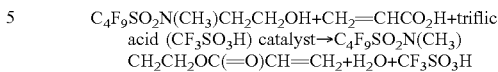

$C_4F_9SO_2N(CH_3)CH_2CH_2OH+CH_2=CHCO_2H$+triflic acid $(CF_3SO_3H)$ catalyst→$C_4F_9SO_2N(CH_3)CH_2CH_2OC(=O)CH=CH_2+H_2O+CF_3SO_3H$ Charges:

A. 112 g MeFBSE alcohol (C$_4$F$_9$SO$_2$N(CH$_3$)CH$_2$CH$_2$OH, 0.313 moles)

B. 0.07 g phenothiazine (available from Sigma-Aldrich, Milwaukee, Wis.)

C. 0.11 g methoxyhydroquinone (MEHQ) (available from Sigma-Aldrich, Milwaukee, Wis.)

D. 100 g heptane

E. 27.5 g acrylic acid (0.38 moles)

F. 1 g anhydrous triflic (trifluoromethanesulfonic) acid (available as FC-24 from 3M, Maplewood, Minn.)

G. 300 g water

H. 300 g water

Procedure:

1. Charges A, B, C, D, E and F were added to a 3-necked flask equipped with decanter assembly, overhead stirrer, and a thermocouple under positive nitrogen pressure.
2. The flask was warmed to 60° C. and the stirring was begun. The batch was stirred at reflux which was initially at 96° C. and rose to 102° C. by the end of the reaction. The theoretical water that should be collected in the decanter was 6.3 ml. After 15 minutes of refluxing, 2 ml had collected. After 1 hour and 15 minutes, the reflux temperature was 99° C. and 5 ml had collected. After 5 hours and 15 minutes the reflux temperature was 102° C. and 5.4 ml had collected. A sample was withdrawn from the batch and GC analysis showed no unreacted alcohol, 92.6% desired product and 7.4% high boiler that is probably the Michael adduct with acrylic acid.
3. The batch was stripped atmospherically to the decanter until at 103° C. no more heptane collected in it.
4. The batch was cooled to 64° C. and vacuum was pulled slowly. More heptane was stripped off until at 5 torr no more liquid was observed to be distilling off.
5. Vacuum was broken and Charge G was added. The batch was stirred at 64° C. for 15 minutes, allowed to phase spilt and the upper layer was vacuumed off.
6. This operation was repeated with Charge H and then the batch was allowed to cool to room temperature at which point the product was a solid. The remaining water was poured off and the product material was melted out of the container into a jar. The weight of the product was 125 g (theoretical 129 g). GC analysis showed the material to be 92.64% desired acrylate and 7.36% acrylic acid Michael adduct.

Preparation 2: Synthesis of MeFBSEMA

MeFBSEMA can be prepared as described in Preparation 1 above, except using methacrylic acid in place of acrylic acid.

FC-1: Preparation of MeFBSEA (30%)/CW750A (65%)/AMPS (5%)

A random acrylic copolymer of MeFBSEA (30 weight %) with CW750A (65 weight %) and AMPS monomer was prepared. The following charges were added to a 500 ml flask under positive nitrogen pressure:

Charges:
- 15 g MeFBSEA
- 32.5 g CW750A
- 2.5 g AMPS
- 2.5 g 2,2'-Azobisisobutyronitrile (available as VAZO™ from Sigma-Aldrich, Milwaukee, Wis.)
- 2.0 g 3-mercapto-1,2-propanediol (available from Sigma-Aldrich, Milwaukee, Wis.)
- 117 g N-(methyl)pyrrolidinone (available from Sigma-Aldrich, Milwaukee, Wis.)
- 2.8 g N-Methyldiethanolamine (available from Sigma-Aldrich, Milwaukee, Wis.)

The batch was heated to 79° C. for 5 hours. The solids content was found to be 27.1% by weight of the resulting polymer solution by evaporation of a small quantity. Analysis of the polymer solution for residual monomer was done using a flame ionization GC, using N,N-Diethyl-m-Toluamide (available from Sigma-Aldrich, Milwaukee, Wis.) as an internal standard in N,N-Dimethylacetamide (available from Sigma-Aldrich, Milwaukee, Wis.), and obtaining calibration curves with the MeFBSEA and the internal standard. Weight % residual MeFBSEA was found to be 0.0201%.

FC-2: Preparation of MeFBSEA (38%)/Pluronic Acrylate (62%)

A random copolymer surfactant of MEFBSEA (38 weight %) with Pluronic acrylate (62 weight %) was prepared.

Charges:
- 570 g Me-FBSEA
- 1431 g Pluronic acrylate 65% in Toluene
- 685 g toluene
- 73 g 3-mercapto-1,2-propanediol
- 29 g N-(methyl)pyrrolidinone
- 73 g 50% t-butyl peroctoate (available as Luperox™ 26M50 from Atofina Chemicals, Inc., Philadelphia, Pa.)

Charges A through E were charged to a five liter flask equipped with an overhead stirrer, thermocouple, reflux condenser with nitrogen flow though the opening used for charging. After charging, the batch was kept under slight positive nitrogen pressure to exclude oxygen from the batch. The temperature set point was raised to 80° C. Charge F was added. Due to the initial exotherm, the batch heated itself to 90° C. A temperature control timer was set for 5 hours and the batch was left for the night. The next day, the reflux condenser was replaced with a one-plate distillation apparatus. Toluene was stripped off at 10–20 mm pressure until the pot temperature rose to 75° C. The resulting contents were poured out and weighed. A total of 1575 g of thick amber liquid was isolated and poured into jars at 50° C.

FC-3: Preparation of MeFBSEMA (55%)/CW750A (35%)/Acrylic Acid (10%)

A random copolymer surfactant of MeFBSEMA (55 weight %) with CW750A (35 weight %) and acrylic acid (10 weight %) was prepared. The following charges were added to a 1000 ml flask under positive nitrogen pressure:
- 55 g MeFBSEMA
- 35 g CW750A
- 10 g acrylic acid
- 6 g t-butyl peroctoate (50% solids in mineral spirits)
- 1 g 3-mercapto-1,2-propanediol
- 100 g ethyl acetate The batch was heated to 79° C. for 8 hours. The solids content was found to be 48.1% by weight of the resulting polymer solution by evaporation of a small quantity.

FC-4: Preparation of MeFBSEA (35%)/CW750A (61%)/Acrylic Acid (2%)/DMAEMA (2%)

A random copolymer surfactant of MeFBSEA (35 weight %) with CW750A (61 weight %), acrylic acid (2 weight %), and DMAEMA (2 weight %) was prepared. The following charges were added to a 1000 ml flask under positive nitrogen pressure:
- 35 g MeFBSEA
- 61 g CW750A
- 2 g acrylic acid
- 2 g DMAEMA
- 8 g t-butyl peroctoate (50% solids in mineral spirits)
- 3 g 3-mercapto-1,2-propanediol
- 100 g ethyl acetate The batch was heated to 79° C. for 8 hours. The solids content was found to be 48.1% by weight of the resulting polymer solution by evaporation of a small quantity.

FC-5: Preparation of MeFBSEMA (35%)/CW750A (63%)/AA (2%)

A random copolymer surfactant of MeFBSEMA (35 weight %) with CW750A (63 weight %), and acrylic acid (2 weight %) was prepared. The following charges were added to a 1000 ml flask under positive nitrogen pressure:
- 35 g MeFBSEMA
- 63 g CW750A
- 2 g acrylic acid
- 6 g t-butyl peroctoate (50% solids in mineral spirits)
- 1 g 3-mercapto-1,2-propanediol
- 100 g ethyl acetate The batch was heated to 79° C. for 8 hours. The solids content was found to be 48.1% by weight of the resulting polymer solution by evaporation of a small quantity.

FC-6: Preparation of $C_4F_9SO_2N(CH_3)(CH_2CH_2O)_{7.5}CH_3$

FC-6 was prepared as described in WO 01/30873, Example 1.

FC-7: Preparation of MeFBSEA (55%)/Pluronic Acrylate (45%)

FC-7 was prepared using the procedure described above for the preparation of FC-2 with the exception that the weight ratio of MeFBSEA/Pluronic acrylate was adjusted to 55/45.

FC-8: Preparation of Bu-FOSEA (30%)/Pluronic Acrylate (70%)

FC-8 was prepared as described in U.S. Pat. No. 3,787,351 (Olson), Example 1.

FC-9: Preparation of $C_8F_{17}SO_2N(Et)(CH_2CH_2O)_{13}H$

FC-9 was prepared as described in U.S. Pat. No. 2,915,554 (Ahlbrecht et al.), Example 2 where n=13).

FC-10: Preparation of MeFBSEMA (53%)/Stearyl Methacrylate (33%)/AA (14%)

A random copolymer surfactant of MeFBSEMA (53 weight %) with stearyl methacrylate (33 weight %) and acrylic acid (14 weight %) was prepared. The following charges were added to a 1000 ml flask under positive nitrogen pressure:
- 53 g MeFBSEMA
- 33 g stearyl methacrylate
- 14 g acrylic acid
- 6 g t-butyl peroctoate (50% solids in mineral spirits)
- 3 g mercaptopropanediol 100 g ethyl acetate The batch was heated to 79° C. for 6 hours. The solids content was found to be 46.7% by weight of the resulting polymer solution by evaporation of a small quantity.

FC-11: Preparation of MeFBSEA (38%)/Pluronic Acrylate (60%)/AA (2%)

FC-11 was prepared using the procedure described above for the preparation of FC-2 with the exception that the weight ratio of MeFBSEA/Pluronic acrylate was adjusted to 38/60 and 2% AA was added.

FC-12: Preparation of MeFBSEA (30%)/Stearyl methacrylate (30%)/CW750A (30%)/AMPS (10%)

FC-12 was prepared using the procedure described above for the preparation of FC-1 with the exception that the weight ratio of MeFBSEA/CW750A was adjusted to 30/30, stearyl methacrylate/AMPS was added at the weight ratio of 30/10.

FC-13: Preparation of MeFBSEMA (30%)/CW750A (70%)

FC-13 was prepared using the procedure described above for the preparation of FC-5 with the exception that the weight ratio of MeFBSEMA/CW750A was adjusted to 30/70 and no AA was added.

FC-14: Preparation of NeFBSEA (40%)/CW750A (51%)/AMPS (5%)/DMAEMA (4%)

FC-14 was prepared using the procedure described above for the preparation of FC-1 with the exception that the weight ratio of MeFBSEA/CW750A/AMPS was adjusted to 40/51/5 and DMAEMA was added at 4%.

FC-15: Preparation of MeFBSEA (50%)/CW750A (50%)

FC-15 was prepared using the procedure described above for the preparation of FC-3 with the exception that MeFBSEMA was replaced with MeFBSEA, no AA was added and the weight ratio of MeFBSEA to CW750A was 50/50

Preparation of Latex Paint Compositions

Examples 1–16

A 1 L jacketed stainless steel beaker was charged with the grind: Joncryl (161.50 g), Propylene glycol (31.45 g), Drew (2.55 g) Ti-Pure (170.00 g) Supermite (134.51 g) Novacite (75.23 g) and Attagel (8.50 g). Cooling water was then turned on and the resulting mixture was dispersed at high speed (11,000 rpm) using a high shear Cowles mixer, equipped with a 32 mm Cowles impeller for about 30 minutes. The high shear Cowles mixer was then replaced with a low shear marine impeller mixer running at 200 rpm and the mixture was let down by adding the letdown: Joncryl (136.00 g), Deionized (DI) Water (223.43 g), Drew (0.85 g) Acrysol (15.30 g), Texanol (18.21 g), Butyl Carbitol (9.37 g), fluorochemical additive (8.35 g premixed 10% active weight per weight in Texanol), Colortrend (4.56 g) and Nuosept (1.28 g).

Comparative Examples C1–C5

Table 1 and Table 2 list the compositions of the grind and the letdown for Comparative Examples C1 through C5. Comparative Examples C1 through C5 were prepared following the general procedure used for the preparation of the paint compositions for Examples 1 through 16 above, but with appropriate amounts of materials as cited in the Tables 1 and 2.

TABLE 1

Comparative Examples C1–C5 Grind Ingredients (in grams)

| Ex | Joncryl | DI Water | Propylene Glycol | Drew | Ti-Pure | Supermite | Kaolin | Novacite | Attagel |
|---|---|---|---|---|---|---|---|---|---|
| C1 | 161.50 | — | 31.45 | 2.55 | 170.00 | 134.51 | — | 75.23 | 8.50 |
| C2 | 297.50 | 79.73 | 31.45 | 2.55 | 170.00 | — | 263.53 | 75.23 | — |
| C3 | 297.50 | 79.73 | 31.45 | 2.55 | 170.00 | — | 263.53 | 75.23 | — |
| C4 | 234.17 | — | 31.45 | 2.55 | 170.00 | 267.12 | — | 75.23 | 8.50 |
| C5 | 268.54 | — | 31.45 | 2.55 | 170.00 | — | 143.57 | 75.23 | — |

TABLE 2

Comparative Examples C1–C5 Letdown Ingredients (in grams)

| Ex | Joncryl | DI Water | Drew | Texanol | Butyl Carbitol | Color Trend | Nuosept | NH$_4$OH | Acrysol | FC |
|---|---|---|---|---|---|---|---|---|---|---|
| C1 | 136.00 | 223.43 | 0.85 | 15.48 | 9.37 | 4.56 | 1.28 | 1.50 | 15.30 | — |
| C2 | — | 98.11 | 0.85 | 2.75 | 9.37 | 4.56 | 1.28 | 1.28 | 8.50 | FC-2 21.24 |
| C3 | — | 98.11 | 0.85 | 23.99 | 9.37 | 4.56 | 1.28 | 1.28 | 8.50 | — |
| C4 | 63.33 | 177.20 | 0.85 | 23.99 | 9.37 | 4.56 | 1.28 | 1.28 | 11.90 | — |
| C5 | 28.96 | 223.93 | 0.85 | 23.99 | 9.37 | 4.56 | 1.28 | 1.28 | 10.20 | — |

Comparative Examples C6–C11

Comparative Examples C6 through C11 were prepared following the general procedure used for the preparation of the paint compositions for Examples 1 through 16 above, but with the appropriate fluorochemical additive as cited in the Table 3.

TABLE 3

Comparative Examples C6–C11 Fluorochemical Additives

| Ex | FC |
|---|---|
| C6 | Zonyl |
| C7 | FC-10 |
| C8 | FC-7 |

TABLE 3-continued

Comparative Examples C6–C11 Fluorochemical Additives

| Ex | FC |
|---|---|
| C9 | FC-8 |
| C10 | FC-6 |
| C11 | FC-9 |

Coating Method and Testing

Coating Method for Stain Release Testing

The latex paint samples were prepared by coating onto a black scrub test panel (Form P121-10N; 16.5 cm×43.2 cm; available from The Leneta Co., Mahwah, N.J.) using a hand coater with a 6 mil (0.15 mm) gap. The resulting latex paint coating was allowed to air dry at ambient temperature and humidity for 7 days.

Soiling/Cleaning Test Method

"Greasy dirt" was prepared by high shear mixing of 50 parts Lanolin (USP anhydrous), 50 parts Petrolatum, 5 parts carbon black, 30 parts stick margarine, and 10 parts mineral oil at 120° F. (50° C.) for about 15 minutes. The resulting greasy dirt was applied onto the coated test panel with a 3" (7.62 cm) paint roller and allowed to set for 18–24 hours. The resulting dirty panel was vigorously rubbed with a clean paper towel to remove as much of the greasy dirt as possible. The panel (painted side up) was then affixed to a Gardner Scrub Machine (available from Gardner Laboratories, Bethesda, Md.). A cellulosic sponge, saturated with 5% DAWN™ dishwashing liquid in DI water (available from Procter & Gamble, Cincinnati, Ohio) and squeezed to remove the bulk of the dishwashing solution, was placed into the scrub machine brush holder. About 200 ml DAWN™ dishwashing liquid (5% in DI water) was applied to the painted and dirtied surface of the scrub test panel. The scrubbing was stopped after 17 double scrubs and the test panel was removed, rinsed with DI water, and air-dried for at least one hour.

Residual Stain Measurement

Residual stain measurements were taken using a Minolta CR200 Chroma meter (available from Minolta Corp, Osaka, Japan) with D65 illuminant. L*, a*, and b* measurements of the unstained portion of the scrub test panel (designated with subscript "u" in the formula below) and stained portion of the scrub test panel (designated with the subscript "s" in the formula below) were taken. To calculate the residual stain, ΔE, the following formula was used:

$$\Delta E = \sqrt{(L^*_u - L^*_s)^2 + (a^*_u - a^*_s)^2 + (b^*_u - b^*_s)^2}$$

This ΔE value represents the distance in the L*a*b* color space between the unstained area and the stained area (see, for example, Richard S. Hunter, THE MEASUREMENT OF APPEARANCE, Wiley-Interscience, pp. 102–130, (1975)). It is a good measurement for the difference in color as perceived by people. The smaller the ΔE value, the cleaner the surface.

Static Contact Angle Test Method

The paint to be tested was coated onto a standard Leneta Scrub test panel using a 6 mil (0.15 mm) gap coater. After drying at ambient conditions for 3 days, a 0.5" (1 cm) by 2" (5 cm) strip was cut from the coated area. The resulting strip was placed on a goniometer (NRI C. A. Goniometer, Model 100-00-US made by Rame-Hart Inc, Mountain Lake, N.J.) viewing stage. A minimum volume drop of reagent grade hexadecane was allowed to fall (from a 5 ml micrometer syringe, equipped with an 18 gage hypodermic needle) onto the coated strip from about ¼" (6 mm). The goniometer viewing light was turned on and the drop was brought into focus. The viewing stage was adjusted to align the zero degree reference line with the bottom of the drop. The movable protractor line was rotated until it was superimposed with the contact angle of the drop. The contact angle was read from the scale. In this test, an angle of 0 degrees means complete wetting, and increasing angles mean a more oil repellent (surface energies less than hexadecane surface energy) surface.

Table 4 lists the results of the Residual Stain Measurement Tests (ΔE) and static contact angle values (°)

TABLE 4

| Example | Description | ΔE | Static Contact Angle (°) |
|---|---|---|---|
| C1 | no Fluorochemical additive | 13.35* | 0 |
| C2 | High PVC, Clay w/FC-2 | 8.80 | 42 |
| C3 | 60% PVC, clay, no Fluorochemical additive | 18.93 | 0 |
| C4 | 60% PVC, CaCO$_3$, no Fluorochemical additive | 18.11 | 0 |
| C5 | 52% PVC, clay, no Fluorochemical additive | 15.34 | 0 |
| C6 | Zonyl | 0.58 | 60 |
| C7 | FC-10 | 9.22 | 27 |
| C8 | FC-7 | 11.92 | 16 |
| C9 | FC-8 | 11.95 | 65 |
| C10 | FC-6 | 13.58 | 68 |
| C11 | FC-9 | 15.02 | |
| 1 | FC-2/FC-3 (75/25) | 0.37 | |
| 2 | FC-11 | 0.4 | 59 |
| 3 | FC-3 | 0.4 | |
| 4 | FC-5 | 0.4 | |
| 5 | FC-3 | 0.44 | 56 |
| 6 | FC-12 | 0.45 | 55 |
| 7 | FC-4 | 0.54 | 43 |
| 8 | FC-13 | 0.6 | 46 |
| 9 | FC-1 | 0.66 | 57 |
| 10 | FC-14 | 0.70 | 62 |
| 11 | FC-15 | 0.89 | 56 |
| 12 | FC-2 | 1.01 | |

*Average of two runs

Results listed in Table 4 indicate that latex paints of the invention (Examples 1–12) perform better than latex paints containing no fluorochemical additive. Additionally, latex paint compositions prepared using perfluorooctanesulfonate derivatives (Comparative Examples C9 & C11) did not exhibit as good ΔE values as those prepared using perfluorobutanesulfonate derivatives of the invention. (Examples 1–12).

Drying Condition Tests

Examples 13–15

A paint composition containing FC-2 such as that prepared for Example 12 was used to coat three samples panels as described above. The coated sample panel for Example 15 was dried in a circulating air oven for 3 days. The coated sample panel for Example 16 was dried under ambient conditions (about 22° C. (72° F.) and less than approximately 55% humidity) for 3 days. The coated sample panel for Example 17 was dried at a controlled temperature of 21°

C. (70° F.) and relative humidity of 70% for 3 days. The Soiling/Cleaning Test was performed on the resulting samples and residual stain measurements were taken. The resulting ΔE values are listed in Table 5.

Examples 16–19

Fluorochemical additive was prepared as described in the preparation of FC-2 above, with the exception that the reaction temperature set point for Examples 16 and 18 was set to 90° C. instead of 80° C. and for Examples 17 and 19 the reaction set point was set to 70° C. instead of 80° C. A paint composition such as that prepared for Example 12, with the exception that 0.1 weight per volume percent fluorochemical additive was added instead of 0.3 weight per volume percent, was used in coating the resulting samples, substituting the appropriate temperature-modified fluorochemical additive as described. Each coated sample panel was dried at a given temperature and relative humidity for 3 days. The Soiling/Cleaning Test was performed on the resulting samples and residual stain measurements were taken. The resulting ΔE values are listed in Table 5.

TABLE 5

| Example | Temperature ° C. (° F.) | % Relative Humidity | ΔE |
|---|---|---|---|
| 13 | 52 (125) | <10 | 4.29 |
| 14 | Approx. 22 (72) | <Approx. 55 | 0.50 |
| 15 | 21 (70) | 70 | 0.16 |
| 16 | 22 (72) | 55 | 0.59 |
| 17 | 22 (72) | 55 | 0.24 |
| 18 | 21 (70) | 70 | 0.29 |
| 19 | 21 (70) | 70 | 0.25 |

The results listed in Table 5 indicate that latex paint compositions of the invention dried at very low relative humidity and high temperature (Example 13) exhibit poorer cleanability (that is, higher ΔE values) than samples dried at lower temperatures and higher relative humidity (Examples 14–19).

Electron Spectroscopy for Chemical Analysis (ESCA)
ESCA Test Method

ESCA measurements were performed on a Surface Science SSX-100 instrument (formerly available from Surface Science, Mountain View, Calif.). This equipment excites photoelectrons using a non-monochromated Al x-ray source. Emitted photoelectrons were detected at a 35° take-off angle with respect to the sample surface. Spectra were obtained and the surface composition was determined by integrating the major peak areas and applying the appropriate sensitivity factors. A typical fluorine detection level is 1-2 atom percent. To determine sub-surface fluorine concentration the sample was sliced using a Ultra Cut-T with FCS cryo microtome (available from Mager Scientific, Dexter, Mich.). Each cut with the cryo-microtome removed 1 μm of painted surface.

Example 20

Paint prepared as in Example 12 was applied to glass microscope slides and dried at ambient temperature and relative humidity. The cut # indicates the number of the consecutive 1-μm cuts taken from the "as painted" original surface. The as painted original surface and cuts 9, 16, 20, and 25 were tested for fluorine levels using the ESCA test method. Results are listed in Table 6.

TABLE 6

| Cut # | Fluorine (atom percent) |
|---|---|
| As painted original surface | 18 |
| 9 | Not detectable |
| 16 | Not detectable |
| 20 | Not detectable |
| 25 | Not detectable |

The data in Table 6 indicate that the majority of fluorochemical additive has migrated to the surface of the dried paint coating.

Various modifications and alterations of this invention will become apparent to those skilled in the art without departing from the scope and spirit of this invention.

What is claimed:

1. A latex paint composition comprising (a) a polymer having interpolymerized units that comprise units derived from styrene, methyl styrene, vinyl, or combinations thereof and units derived from one or more acrylates, methacrylates, acrylonitrile, or combinations thereof, (b) hiding pigment, (c) non-cellulosic thickener, and (d) at least about 0.05 weight per volume percent fluorochemical acrylic polymer additive selected from those represented by the following general formula:

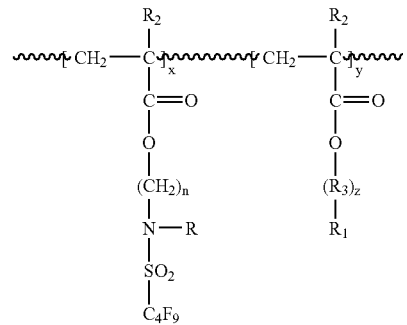

wherein:
    ⋯ represents a bond in a polymer chain;
    R, $R_1$ and $R_2$ are each indenpendently hydrogen or alkyl of 1 to 4 carbon atoms;
    $R_3$ is at least one or more straight or branched alkyleneoxy groups, linked together and having 2 to 6 carbon atoms, or a straight or branched alkylene group having 12 to 20 carbon atoms;
    n is an integer from 2 to 10; and
    x, y and z are integers of at least 1.

2. The paint composition of claim 1 wherein said fluorochemical acrylic polymer additive further comprises an anionic water-solubilizing polar group.

3. The paint composition of claim 2 wherein said anionic water-solubilizing polar group is selected from the group consisting of sulfonates, sulfates, and carboxylates.

4. The paint composition of claim 1 wherein said R, $R_1$, and $R_2$ are each independently hydrogen or methyl.

5. The paint composition of claim 1 wherein said n is 2.

6. The paint composition of claim 1 wherein said $R_3$ is a group selected from those represented by the following general formulas:

$$(EO)_p\text{-}(PO)_q\text{-}(EO)_p \text{ or } (PO)_q\text{-}(EO)_p\text{-}(PO)_q$$

wherein:
EO is an ethyleneoxy moiety;
PO is a propyleneoxy moiety;
p is an integer of 1 to about 165; and
q is an integer of 0 to about 55.

7. The paint composition of claim 6 wherein said $R_3$ is represented by the following general formula:

$(PO)_q\text{-}(EO)_p\text{-}(PO)_q.$

8. The paint composition of claim 7 wherein said q is an integer of about 5 to about 25 and said p is an integer from about 10 to about 165.

9. The paint composition of claim 6 wherein said $R_3$ is represented by the following general formula:

$(EO)_p\text{-}(PO)_q\text{-}(EO)_p.$

10. The paint composition of claim 9 wherein said p is an integer or about 5 to about 130 and said q is an integer of about 20 to about 55.

11. The paint composition of claim 10 wherein said p is about 11 and said q is about 21.

12. The paint composition of claim 11 wherein said R is methyl.

13. The paint composition of claim 1 wherein said fluorochemical acrylic polymer additive comprises the reaction product of:

(i) a compound represented by the following general formula:

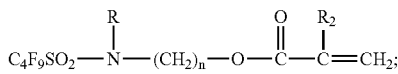

(ii) a compound selected from the group consisting of

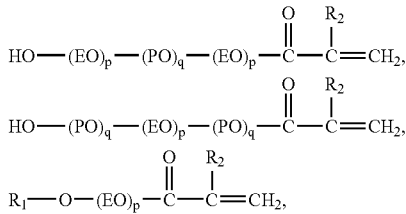

and mixtures thereof; and
(iii) a compound represented by the following general formula:

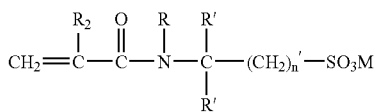

wherein:
R, $R_1$, $R_2$, R' are hydrogen or alkyl of 1 to 4 carbon atoms,
n is an integer of 2 to about 10,
EO is an ethyleneoxy moiety,
PO is a propyleneoxy moiety,
p is an integer of 1 to about 130,
q is an integer of 0 to about 55,
n' is an integer of 1 to about 10, and
M is hydrogen or a cation.

14. The paint composition of claim 13 wherein (iii) is a compound represented by the following general formula:

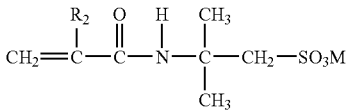

wherein:
$R_2$ is hydrogen or methyl and M is hydrogen, potassium, ammonium, lithium, or a protonated tertiary amine.

15. The paint composition of claim 13 wherein said fluorochemical acrylic polymer additive comprises the reaction product of (i), (ii), (iii), and (iv); wherein (iv) is a compound represented by the following general formula:

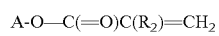
$\text{A-O}\text{—}\text{C}(\!\!=\!\!\text{O})\text{C}(R_2)\!\!=\!\!CH_2$ wherein:
A is an amino-containing group or an alkyl of 12 to 20 carbon atoms.

16. The paint composition of claim 1 wherein said fluorochemical acrylic polymer additive comprises the reaction product of:

(i) a compound represented by the following general formula:

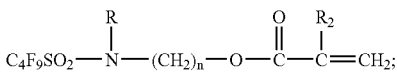

(ii) a compound selected from the group consisting of

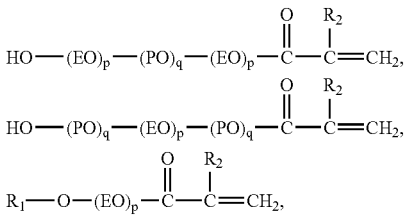

and mixtures thereof; and
(iii) a compound represented by the following general formula:

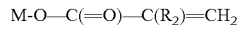
$\text{M-O}\text{—}\text{C}(\!\!=\!\!\text{O})\text{—}\text{C}(R_2)\!\!=\!\!CH_2$ wherein:
R, $R_1$, $R_2$, and R' are independently hydrogen or alkyl of 1 to 4 carbons atoms,
n is an integer of 2 to about 10,
EO is an ethyleneoxy moiety,
PO is a propyleneoxy moiety,
p is an integer of 1 to about 130,
q is an integer of 0 to about 55, and
M is H, potassium, sodium, ammonium, or protonated tertiary amine.

17. The paint composition of claim 16 wherein said M as H or ammonium.

18. The paint composition of claim 16 wherein said fluorochemical acrylic polymer additive comprises the reaction product of (i), (ii), (iii), and (iv); wherein (iv) is a compound represented by the following general formula:

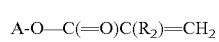
$\text{A-O}\text{—}\text{C}(\!\!=\!\!\text{O})\text{C}(R_2)\!\!=\!\!CH_2$ wherein:
   A is an amine-containing group or an alkyl of 12 to 20 carbon atoms.
19. The paint composition of claim 1 wherein said polymer has a glass-transition temperature between 21° C. and 95° C.
20. The paint composition of claim 1 wherein said hiding pigment has an index of refraction above about 1.8.
21. The paint composition of claim 1 wherein thickener is an associative thickener.
22. The paint composition of claim 21 wherein said thickener is a polyurethane associative thickener.
23. The paint composition of claim 1 wherein said latex paint further comprises a flatting agent and has an 85° gloss of less than or equal to about 20.
24. The paint composition of claim 23 wherein said flatting agent is silica.
25. The paint composition of claim 1 wherein said latex paint has a pigment volume concentration of less than about 55%.
26. The paint composition of claim 1 wherein said latex paint further comprises a calcium carbonate functional extender.
27. The paint composition of claim 1 wherein said latex paint further comprises a coalescing solvent.
28. The paint composition of claim 27 wherein said coalescing solvent is butyldiglycol, 2,2,4-trimethyl-1,3-pentandiol-monoisobutyrate, or combinations thereof.
29. An article wherein a portion of at least one surface of said article is coated with the paint composition of claim 1.
30. A method of imparting stain and soil resistance to a latex paint coating comprising the steps of
   (a) providing a latex paint composition comprising (1) a polymer having interpolymerized units that comprise units derived from styrene, methyl styrene, vinyl, or combinations thereof and units derived from one or more acrylates, methacrylates, acrylonitrile, or combinations thereof, (2) hiding pigment, and (3) non-cellulosic thickener; wherein said latex paint has a pigment volume concentration of at least 20% and less than its critical pigment volume concentration;
   (b) adding at least about 0.05 weight per volume percent of a fluorochemical acrylic polymer additive selected from those represented by the following general formula:

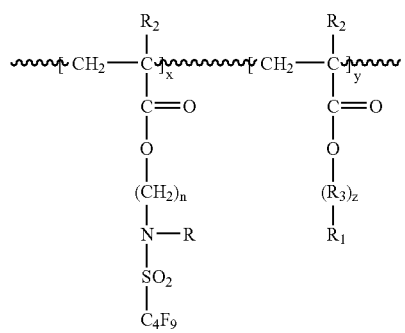

wherein:
   ⁓represents a bond in a polymer chain;
   R, R$_1$ and R$_2$ are each independently hydrogen or alkyl of 1 to 4 carbon atoms;
   R$_3$ is at least one or more straight or branched alkyleneoxy groups, linked together and having 2 to 6 carbon atoms, or a straight or branched alkylene group having 12 to 20 carbon atoms;
   n is an integer from 2 to 10; and
   x, y and z are integers of at least 1;
   (c) applying the resulting composition of (b) to a substrate surface; and
   (d) allowing said resulting composition to dry such that a coating with a fluorine-enriched surface is formed on said substrate surface.
31. The method of claim 30 wherein said polymer has a glass-transition temperature between 21° C. and 95° C.
32. The method of claim 30 wherein said resulting composition is allowed to dry at a temperature of about 10° C. to about 40° C. and a relative humidity of about 20% to about 90%.
33. The method of claim 30 wherein said fluorochemical acrylic polymer additive comprises the reaction product of:
   (i) a compound represented by the following general formula:

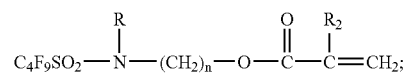

(ii) a compound selected from the group consisting of

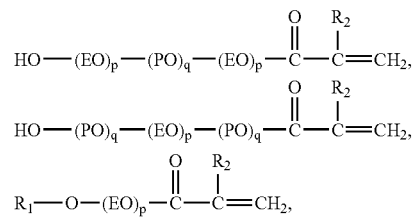

and mixtures thereof; and
   (iii) a compound represented by the following general formula:

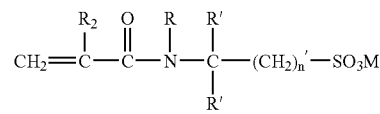

wherein:
   R, R$_1$, R$_2$, R' are hydrogen or alkyl of 1 to 4 carbon atoms,
   n is an integer of 2 to about 10,
   EO is an ethyleneoxy moiety,
   PO is a propyleneoxy moiety,
   p is an integer of 1 to about 128,
   q is an integer of 0 to about 55, and
   n' is an integer of 1 to about 10.
34. The method of claim 30 wherein said fluorochemical acrylic polymer additive comprises the reaction product of:
   (i) a compound represented by the following general formula:

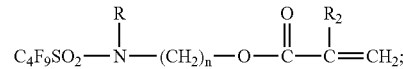

(ii) a compound selected from the group consisting of

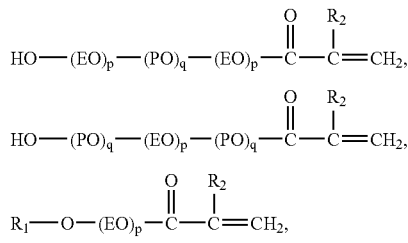

and mixtures thereof; and (iii) a compound represented by the following general formula:

$$M\text{-}O\text{—}C(=O)\text{—}C(R_2)=CH_2$$

wherein:
R, $R_1$, $R_2$, R' are independently hydrogen or alkyl of 1 to 4 carbons atoms,
n is an integer of 2 to about 10,
EO is an ethyleneoxy moiety,
PO is a propyleneoxy moiety,
p is an integer of 1 to about 130,
q is an integer of 0 to about 55, and
M is H, potassium, sodium, ammonium, or protonated tertiary amine.

* * * * *

UNITED STATES PATENT AND TRADEMARK OFFICE
CERTIFICATE OF CORRECTION

PATENT NO. : 7,041,727 B2  
APPLICATION NO. : 10/183176  
DATED : May 9, 2006  
INVENTOR(S) : Brian A. Kubicek It is certified that error appears in the above-identified patent and that said Letters Patent is hereby corrected as shown below:

Column 2,  
Line 63, after "(1959))" insert -- . --.

Column 3,  
Line 23, delete "repellents" and insert in place thereof -- repellants --.

Column 6,  
Line 18, delete "N⊕)HCH$_3$))." and insert in place thereof -- N⊕HCH$_3$)). --.

Column 9,  
Line 15, delete "20" and insert in place thereof -- 20° --.

Column 13,  
Line 66, delete "170°" and insert in place thereof -- 170° C. --.

Column 17,  
Line 20, delete "NeFBSEA" and insert in place thereof -- MeFBSEA --.

Column 20,  
Line 16, after (°) insert -- . --.

Column 22,  
Line 47, delete "indenpendently" and insert in place thereof -- independently --.

Column 23,  
Line 17, delete "or" and insert in place thereof -- of --.

Column 24,  
Line 19, delete "amino-containing" and insert in place thereof -- amine-containing --.  
Line 60, delete "as" and insert in place thereof -- is --.

UNITED STATES PATENT AND TRADEMARK OFFICE
CERTIFICATE OF CORRECTION

PATENT NO. : 7,041,727 B2
APPLICATION NO. : 10/183176
DATED : May 9, 2006
INVENTOR(S) : Brian A. Kubicek It is certified that error appears in the above-identified patent and that said Letters Patent is hereby corrected as shown below:

Column 28,
Line 5, after "$R_2$," insert -- and --.

Signed and Sealed this

Fifteenth Day of April, 2008

JON W. DUDAS
*Director of the United States Patent and Trademark Office*